Aug. 11, 1953     A. W. SCHWERTNER     2,648,407
BRAKE CONTROL MEANS FOR TRAILERS
Filed Sept. 13, 1951
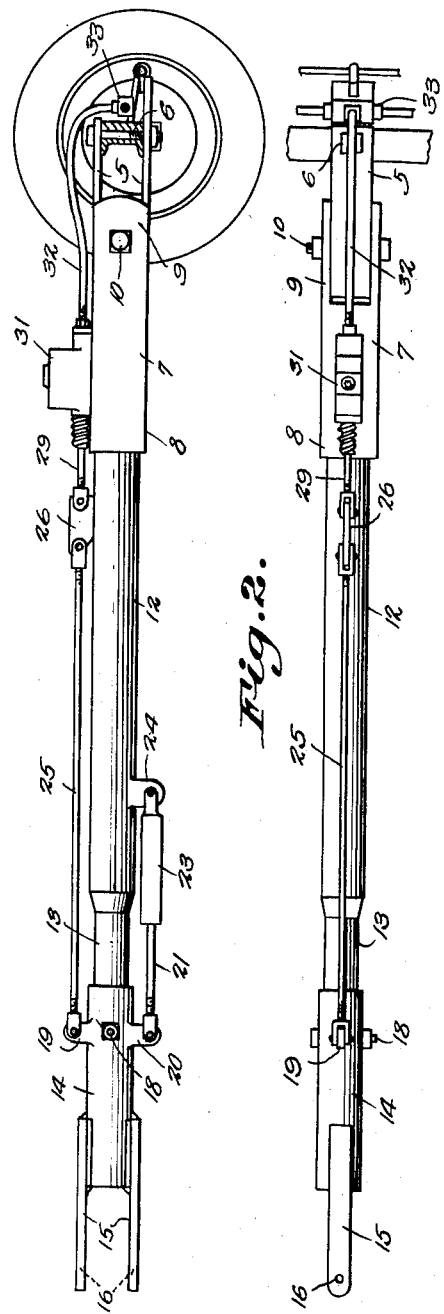
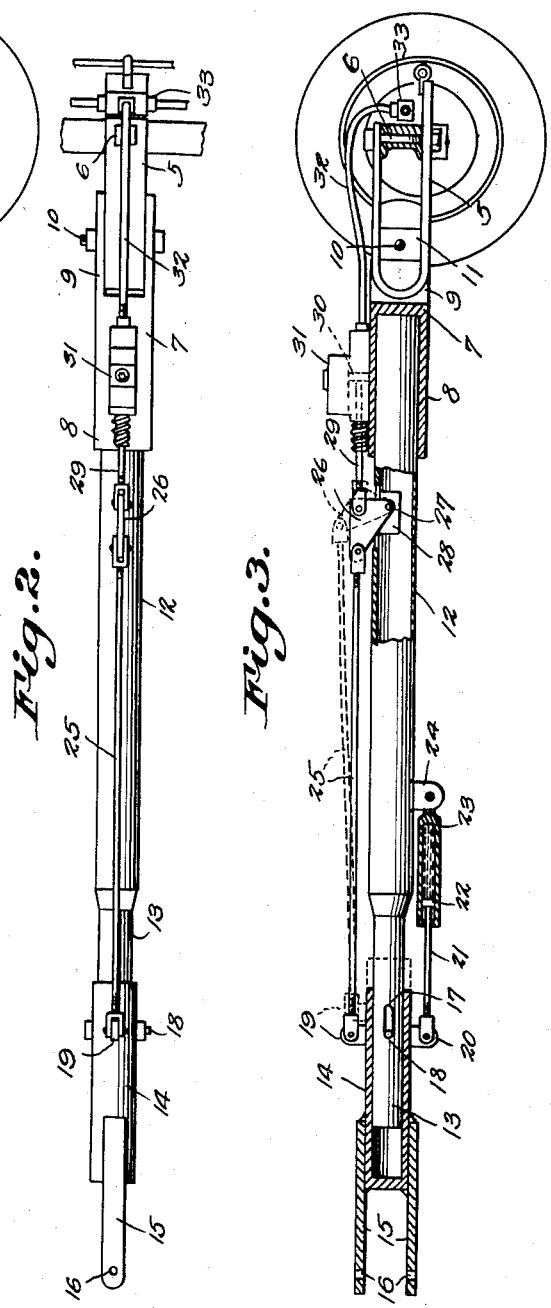
A. W. Schwertner
INVENTOR
BY C. A. Snow & Co.
ATTORNEYS.

Patented Aug. 11, 1953

2,648,407

UNITED STATES PATENT OFFICE 2,648,407

BRAKE CONTROL MEANS FOR TRAILERS

Armin W. Schwertner, Vancourt, Tex.

Application September 13, 1951, Serial No. 246,379

2 Claims. (Cl. 188—112)

This invention relates to an attachment in the form of means for automatically applying the brakes on trailers when the brakes of the tractor or towing vehicle are applied.

An important object of the invention is to provide a device of this character which will apply the brakes of the trailer simultaneously with the application of the brakes of the tractor or towing vehicle, the construction of the attachment being such that pressure on the hydraulic booster forming a part of the device will be rapidly increased, with the result that the operation of the device will be to slow down the movement of the trailer before the brakes of the tractor are fully applied, thereby insuring against overrunning of the tractor by the trailer during sudden stopping of the tractor.

Another important object of the invention is to provide a device of this character which may be installed as a part of the tractor hitch without the necessity of making extensive alterations in the tractor or trailer structure to mount the attachment.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a side elevational view of a structure hitch equipped with an attachment constructed in accordance with the invention.

Fig. 2 is a plan view thereof.

Fig. 3 is a side elevational view of the tractor hitch and attachment, parts thereof being shown in section.

Referring to the drawing in detail the hitch comprises the bracket 5 which is substantially U-shape in formation, the bracket 5 being connected to the front axle by means of the bolt 6. The construction of the bracket 5 is such that it provides a support and guide for the movable section 7 of the hitch, the section 7 having a tubular portion 8 and a bifurcated end 9, the bifurcated end 9 being fitted over the side faces of the bracket 5, as clearly shown by the drawing.

The bolt 10 connects the furcations of the bifurcated end 9 and also provides a support for the block 11, adjustably mounting the U-shaped bracket. The connection between the bolt and block 11 is such that vertical pivotal movement of the tubular portion 8 will be such as to compensate for vertical movement of the hitch or front axle of the trailer, with respect to each other when the tractor and trailer are moving over irregular road surfaces.

Secured within the tubular portion 8 is the main section 12 of the hitch which has its forward end disposed at 13 over which the tube 14 operates, the tube 14 providing the connection between the arms 15, forming a part of the tractor hitch and the tractor, as shown. The arms 15 are arranged in vertical spaced relation with respect to each other to receive the bolt, not shown, which will pass through the bolt openings 16 to secure the tractor hitch to a clevis or securing bracket carried by the tractor, and which is not shown in the present illustration.

Formed in the reduced forward end 13 of the main tubular section 12, is the opening 17 which is elongated longitudinally of the reduced forward end 13, in which the transversely extended bolt 18 is positioned, the bolt 18 being carried by the tube 14 so that movement of the tube 14 longitudinally of the reduced forward end 13 will be permitted. Ears 19 and 20 extend from the tube 14, the ear 20 providing means for connecting the piston rod 21 to the tube 14. The plunger or piston 22 secured on one end of the piston rod 21, moves in the cylinder 23, which is filled to capacity with oil or similar braking fluid. The cylinder 23 has pivotal connection with the tubular section 12, through the ear 24 that extends therefrom. It will of course, be understood that the plunger or piston 22 is provided with an opening or openings extending therethrough to permit the fluid or oil contained in the cylinder 23, to pass through the piston as the piston moves longitudinally of the cylinder 23, thereby providing cushioning means for retarding movement of the tube 14, longitudinally of the reduced forward end 13 of the main tubular section 12.

Pivotally connected with the ear 19 is the actuating rod 25, which extends longitudinally of the main tubular section 12, and has pivotal connection with the substantially triangular plate 26 which has a portion thereof pivotally mounted within a slot formed in the surface of the tubular section 12, the plate 26 being mounted for pivotal movement on the pivot pin 27 that is mounted between depending flanges 28 that extend into the tubular section 12. The rod 29 is also pivotally connected to the plate 26 at one corner thereof and this rod 29 moves into the cylinder 30 formed at the bottom of the fluid chamber 31, the fluid chamber 31 being in communication with the cylinder 30 through openings to allow fluid from the chamber 31 to pass into the cylinder 30. The cylinder 30 is in communication with the pipe line 32 which leads from one end of the cylinder to the individual brake cylinders 33 of the various wheels of the trailer.

From the foregoing it will be seen that due to the construction shown and described, I have provided means whereby the fluid brakes of a trailer, may be applied simultaneously with the application of the brakes of the tractor or towing vehicle, to the end that the movement of the trailer will be gradually retarded before the brakes of the tractor are applied to the maximum, thereby preventing the overrunning of the tractor by the trailer in the event that the brakes of the tractor or towing vehicle are suddenly applied.

In the operation of the device, assuming that the brakes of the tractor equipped with a hitch constructed in accordance with the present invention are applied, the tube 14 will be forced rearwardly against the action of the piston 22 moving in the cylinder 23. With the rearward movement of the tube 14, the actuating rod 25 will be moved to the dotted line position shown by Fig. 3 of the drawing which results in movement of the piston and rod 29 within the cylinder 30, forcing a quantity of braking fluid into the brake cylinders of the individual wheels of the trailer, applying the brakes on the trailer to prevent the weight and force of the trailer being directed to the tractor to impair the maneuverability of the tractor.

Having thus described the invention, what is claimed is:

1. The combination with a trailer having a front axle and individual wheel-fluid brake cylinders and brakes and the tractor towing said trailer, of a trailer hitch connecting the trailer and tractor, comprising a main tubular section pivotally connected to the front axle of the trailer, a tubular member slidable over the front end of said tubular section, means for connecting the tubular section with such towing tractor, a booster mounted on the main tubular section adjacent to the trailer, including a cylinder and piston operating in the cylinder, a pipe-line connected between the booster-cylinder and brake cylinders of the trailer wheels, an actuating rod connected with said tubular member, a vertical triangular plate pivotally mounted on said tubular section to which said actuating rod is pivotally connected, and a piston and rod connected between said triangular plate and booster cylinder adapted to force fluid into the brake cylinders of the wheels, applying the brakes of the trailer, and means for equalizing the movements of said rod and piston.

2. The combination with a trailer and towing tractor, of a trailer hitch embodying a bracket bolted to the axle of such trailer, said bracket comprising upper and lower guide members, a tubular section having a bifurcated end fitted over one end of said bracket, a pivot block held within the guides, a bolt extending through the furcations of said bifurcated member and block, pivotally connecting said tubular section with said bracket, and means for connecting the forward end of said trailer hitch to a towing tractor.

ARMIN W. SCHWERTNER.

References Cited in the file of this patent

UNITED STATES PATENTS

| Number | Name | Date |
|---|---|---|
| 1,879,981 | Hamilton | Sept. 27, 1932 |
| 2,574,406 | Machamer | Nov. 6, 1951 |